(12) United States Patent
Kim et al.

(10) Patent No.: US 12,718,989 B2
(45) Date of Patent: Aug. 25, 2026

(54) TANTALUM CAPACITOR

(71) Applicant: SAMSUNG ELECTRO-MECHANICS CO., LTD., Suwon-si (KR)

(72) Inventors: Boum Seock Kim, Suwon-si (KR); Chin Mo Kim, Suwon-si (KR); Kang Wook Bong, Suwon-si (KR); Jin Young Kim, Suwon-si (KR); Seong Jun Park, Suwon-si (KR); Sung Yong An, Suwon-si (KR); Joung Hee Cho, Suwon-si (KR); Yu Jin Ham, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 134 days.

(21) Appl. No.: 18/752,130

(22) Filed: Jun. 24, 2024

(65) Prior Publication Data

US 2025/0014841 A1 Jan. 9, 2025

(30) Foreign Application Priority Data

Jul. 3, 2023 (KR) ........................ 10-2023-0085779
Jul. 26, 2023 (KR) ........................ 10-2023-0097580

(51) Int. Cl.
*H01G 11/76* (2013.01)
*H01G 11/78* (2013.01)

(52) U.S. Cl.
CPC ............. *H01G 11/76* (2013.01); *H01G 11/78* (2013.01)

(58) Field of Classification Search
CPC ........ H01G 11/76; H01G 11/78; H01G 9/012; H01G 9/10; H01G 9/15; H01G 9/008; H01G 9/004; H01G 9/08
See application file for complete search history.

(56) References Cited

U.S. PATENT DOCUMENTS

2006/0038304 A1* 2/2006 Osako ..................... H01L 24/29 257/789
2011/0096467 A1* 4/2011 Taketani .................. H01G 9/08 29/25.03

(Continued)

FOREIGN PATENT DOCUMENTS

CN 106169372 B * 11/2019 ............. H01G 9/012
CN 110720131 A * 1/2020 ............... H01G 9/15

(Continued)

OTHER PUBLICATIONS

Korean Office Action dated Jun. 26, 2024 issued in Korean Patent Application No. 10-2023-0097580 (with English translation).

*Primary Examiner* — Dion R. Ferguson
(74) *Attorney, Agent, or Firm* — Morgan Lewis & Bockius LLP

(57) ABSTRACT

A tantalum capacitor includes a tantalum body including a tantalum element, a conductive polymer layer disposed on the tantalum element, and a tantalum wire penetrating through at least a portion of each of the tantalum element and the conductive polymer layer in a first direction, a molded unit surrounding the tantalum body and, an anode lead frame exposed to one surface of the molded unit and connected to the tantalum wire, a cathode lead frame spaced apart from the anode lead frame and exposed to the one surface of the molded unit, and a first coating layer disposed in at least a portion of a region between the molded unit and the anode lead frame and a region between the molded unit and the cathode lead frame.

17 Claims, 7 Drawing Sheets

(56) References Cited

U.S. PATENT DOCUMENTS

| | | | | |
|---|---|---|---|---|
| 2015/0049419 | A1* | 2/2015 | Biler | H01G 9/012<br>361/536 |
| 2015/0213961 | A1* | 7/2015 | Liu | H01G 9/012<br>29/25.03 |
| 2016/0189872 | A1* | 6/2016 | Naito | H01G 9/04<br>29/25.03 |
| 2025/0014841 | A1* | 1/2025 | Kim | H01G 9/012 |
| 2025/0174411 | A1* | 5/2025 | Cho | H01G 9/15 |
| 2025/0201490 | A1* | 6/2025 | Lee | H01G 9/15 |

FOREIGN PATENT DOCUMENTS

| | | | |
|---|---|---|---|
| JP | 5330191 | B2 | 8/2013 |
| JP | 2015-037192 | A | 2/2015 |
| JP | 2015-142134 | A | 8/2015 |
| JP | 2016-122689 | A | 7/2016 |
| JP | 6110964 | B2 | 4/2017 |
| KR | 10-2244977 | B1 | 4/2021 |

* cited by examiner

TANTALUM CAPACITOR

CROSS-REFERENCE TO RELATED APPLICATION(S)

This application claims benefit of priority to Korea patent Application Nos. 10-2023-0085779 filed on Jul. 3, 2023 and 10-2023-0097580 filed on Jul. 26, 2023 in the Korean Intellectual Property Office, the disclosures of which are incorporated herein by reference in their entireties.

TECHNICAL FIELD

The present disclosure relates to a tantalum capacitor, and more particularly, to a tantalum capacitor having improved reliability against stress and moisture resistance.

Tantalum (Ta) is a metal widely used across industries, including in the electricity and electronics, machinery, chemical engineering, medicine, space, and military industries, due to mechanical and physical characteristics thereof, such as high melting point and excellent ductility and corrosion resistance.

In particular, Ta is currently widely used as an anode material for small capacitors due to characteristics thereof which form the most stable anodized oxide film among all metals.

Moreover, the use of tantalum materials has rapidly increased every year due to the recent rapid development of IT industries, such as electronics and information and communication.

Tantalum capacitors use a structure using an internal lead frame to connect a tantalum body and electrodes. In this case, if sufficient adhesion between the internal lead frame and a molded unit is not secured, an interfacial defect may occur and moisture may penetrate through the interface. This degrades the characteristics of tantalum capacitors in high temperature and high humidity environments and affects reliability.

SUMMARY

An aspect of the present disclosure is to provide a tantalum capacitor having excellent reliability by strengthening an interface and lowering a moisture absorption rate.

An aspect of the present disclosure is to provide a tantalum capacitor with enhanced resistance to stress.

According to an aspect of the present disclosure, a tantalum capacitor includes a tantalum body including a tantalum element, a conductive polymer layer disposed on the tantalum element, and a tantalum wire penetrating through at least a portion of each of the tantalum element and the conductive polymer layer in a first direction, a molded unit surrounding the tantalum body and including fifth and sixth surfaces opposing each other in the first direction, third and fourth surfaces opposing each other in a second direction, and first and second surfaces opposing each other in a third direction, an anode lead frame exposed to the second surface of the molded unit and connected to the tantalum wire, a cathode lead frame spaced apart from the anode lead frame and exposed to the second surface of the molded unit, and a first coating layer disposed in at least a portion of a region between the molded unit and the anode lead frame and a region between the molded unit and the cathode lead frame.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
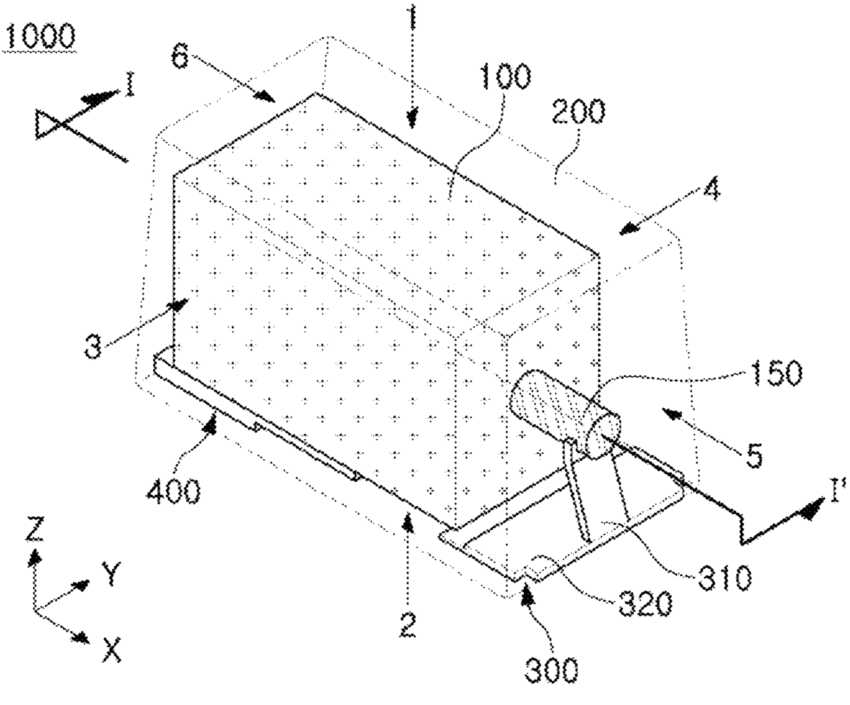
FIG. 1 is a perspective view of a tantalum capacitor according to the present disclosure.

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

Hereinafter, exemplary embodiments in the present disclosure will be described with reference to the accompanying drawings.

In the drawing, an X-direction may be defined as a first direction, an L-direction, or a length direction, a Y-direction may be defined as a second direction, a W direction, or a width direction, and a Z-direction may be defined as a third direction, a T-direction, or a thickness direction.

FIG. 1 is a perspective view of a tantalum capacitor according to the present disclosure.

Figure 2:
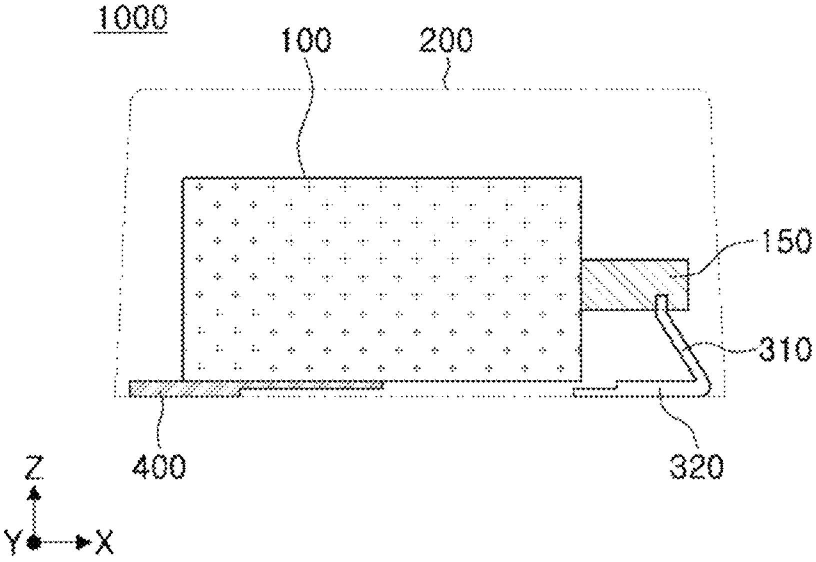
FIG. 2 is a diagram illustrating a tantalum capacitor viewed in a second direction according to the present disclosure.

FIG. 2 is a diagram illustrating a tantalum capacitor viewed in a second direction according to the present disclosure.

Figure 3:
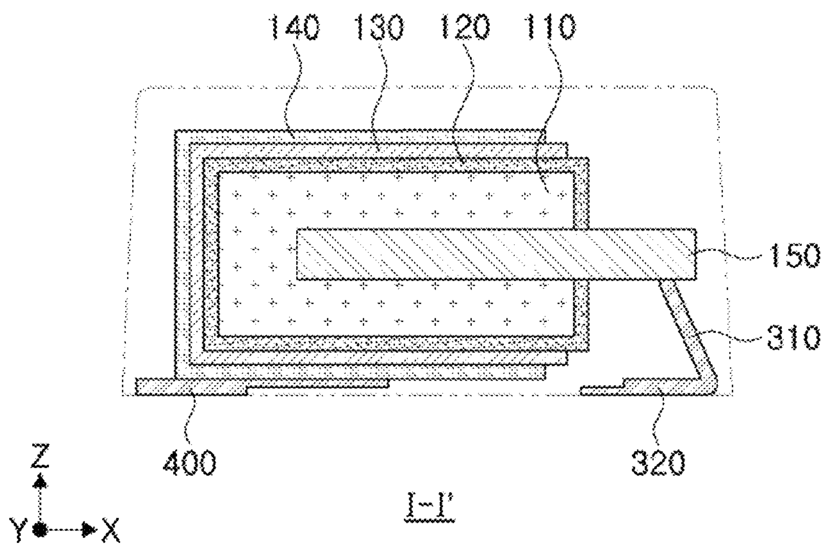
FIG. 3 is a cross-sectional view taken along line I-I' of FIG. 1 in which a coating layer is omitted.

FIG. 3 is a cross-sectional view taken along line I-I' of FIG. 1 without a coating layer in an exemplary embodiment in the present disclosure. Alternatively, FIG. 3 is a cross-sectional view of a related art tantalum capacitor without a coating layer, and may be considered as a comparative example.

Referring to FIGS. 1 to 3, a tantalum capacitor 1000 of the present exemplary embodiment may include a tantalum body 100 including a tantalum element 110, a conductive polymer layer 120 disposed on the tantalum element, and a tantalum wire 150 penetrating through at least a portion of each of the tantalum element 110 and the conductive polymer layer 120 in the first direction, a molded unit 200 including fifth and sixth surfaces 5 and 6 opposing each other in the first direction (the X-direction), third and fourth surfaces 3 and 4 opposing each other in the second direction (the Y-direction), and first and second surfaces 1 and 2 opposing each other in the third direction (the Z-direction) and surrounding the tantalum body 100, an anode lead frame 300 exposed to the second surface 2 of the molded unit 200 and connected to the tantalum wire 150, a cathode lead frame 400 spaced apart from the anode lead frame 300 and exposed to the second surface 2 of the molded unit 200, and a first coating layer 510 (shown in FIGS. 4-13) disposed in at least a portion of an interface (or a region) between the molded unit 200 and the anode lead frame 300 and an interface (or a region) between the molded unit 200 and the cathode lead frame 400.

The tantalum body 100 may have the tantalum wire 150 exposed in the first direction (the X-direction) of the body 100. Here, the tantalum wire 150 may penetrate through at least a portion of the tantalum element 110 in the first direction (the X-direction). The tantalum wire 150 may be inserted into and installed in a mixture of tantalum powder and a binder to be off-centered before the mixture of the tantalum powder and the binder is compressed. That is, the tantalum body 100 may be formed by insertedly installing the tantalum wider 150 in the tantalum powder mixed with the binder, forming a tantalum element having a desired size, and then sintering the tantalum element in a high temperature and high vacuum ($10^{-5}$ torr or less) atmosphere for about 30 minutes.

The molded unit 200 may cover the tantalum body 100 and may be formed so that one surface of a first connection portion 320 of the anode lead frame 300 and one surface of the cathode lead frame 400 are exposed.

The molded unit 200 of the tantalum capacitor according to the present disclosure may be formed by transfer molding a resin, such as epoxy molding compound (EMC) to surround the tantalum body 100. This molded unit 200 serves to protect the tantalum wire 150 and the tantalum body 100 from the outside.

The anode lead frame 300 may be connected to the tantalum wire 150 and may serve as a terminal when mounting on a board. The anode lead frame 300 may include the first connection portion 320 and a first bent portion 310, and the first bent portion 310 may be inclined toward the tantalum body 100 based on the first connection portion 320. The first connection portion 320 of the anode lead frame 300 may be exposed to the second surface 2 of the molded unit 200. The first connection portion 320 may be exposed to a lower surface of the molded unit 200 and may serve as a terminal when mounting on a board. Here, the first connection portion 320 may be spaced apart from the tantalum body 100 and may function as an anode of the tantalum capacitor 1000 according to the present disclosure. To this end, the anode lead frame 300 may be formed of a conductive metal, such as nickel/iron alloy.

The cathode lead frame 400 may be connected to the tantalum body 100 and may serve as a terminal when mounted on a board. The cathode lead frame 400 may be disposed to be spaced apart from the anode lead frame 300 and be parallel to the first direction (the X-direction). The cathode lead frame 400 may be exposed to the second surface 2 of the molded unit 200. The cathode lead frame 400 may be exposed to the lower surface of the molded unit 200 and may serve as a terminal when mounted on a board, and may function as a cathode of the tantalum capacitor 1000 according to the present disclosure. To this end, the cathode lead frame 400 may be formed of a conductive metal, such as nickel/iron alloy.

Meanwhile, although not illustrated in the drawings, the tantalum capacitor according to an exemplary embodiment in the present disclosure may further include a conductive adhesive layer to bond the cathode lead frame 400 to the tantalum body 100. Such a conductive adhesive layer may be formed, for example, by applying and curing a certain amount of a conductive adhesive including an epoxy-based thermosetting resin and conductive metal powder, such as silver (Ag), but the present disclosure is not limited thereto.

Referring to FIG. 3, the tantalum body 100 of the tantalum capacitor 1000 according to an exemplary embodiment in the present disclosure may include the tantalum element 110 formed by sintering a molded body including metal powder, a conductive polymer layer 120 disposed above the tantalum element 110, a carbon layer 130 disposed on the conductive polymer layer 120, and a silver (Ag) layer 140 disposed on the carbon layer 130.

The tantalum capacitor may further include the tantalum wire 150 having an insertion region located inside the tantalum element 110 and a non-insertion region located outside the tantalum element 110.

The tantalum element 110 may be formed by sintering a molded body including metal powder and a binder.

Specifically, the tantalum element 110 may be manufactured by mixing metal powder, a binder, and a solvent at a certain ratio, stirring the mixture, compressing the mixed powder to form a rectangular parallelepiped, and then sintering the same under high temperature and high vibration.

The metal powder is not limited as long as it may be used in the tantalum element 110 of the tantalum capacitor 1000 according to an exemplary embodiment in the present disclosure, and may be tantalum (Ta) powder. However, without being limited thereto, the metal powder may be one or more selected from the group consisting of aluminum (Al), niobium (Nb), vanadium (V), titanium (Ti), and zirconium (Zr), and accordingly, an aluminum element, a niobium element, and the like, instead of a tantalum body, may also be used.

The binder is not limited and may be, for example, a cellulose-based binder.

The cellulose-based binder may be one or more selected from the group consisting of nitrocellulose, methyl cellulose, ethyl cellulose, and hydroxy propyl cellulose.

In addition, the tantalum wire 150 may be inserted into and installed therein to be off-centered, before compressing the mixed powder.

According to an exemplary embodiment in the present disclosure, a dielectric oxide layer may be formed as an insulating layer on the tantalum element 110. That is, the dielectric oxide layer may be formed by growing an oxide film ($Ta_2O_5$) on the surface of the tantalum element 110 through a formation; process using an electrochemical reaction. Here, the dielectric oxide layer changes the tantalum element 110 into a dielectric. In addition, the conductive polymer layer 120 having a negative polarity may be applied and formed on the dielectric oxide layer.

The conductive polymer layer 120 is not limited and may include, for example, a conductive polymer.

Specifically, the conductive polymer may be formed using chemical polymerization or electropolymerization using EDOT (3,4-ethylenedioxythiophene), pyrrole monomer, or polypyrrole, and then may be formed as a negative layer having a conductive polymer negative electrode on an external surface of the tantalum element 110 formed as an insulating layer.

That is, the conductive polymer layer 120 may be formed using a polymer slurry, and the polymer slurry may include at least one of polypyrrole, polyaniline, or EDOT (3,4-ethylenedioxythiophene). In addition, the conductive polymer layer 120 may include PEDOT:PSS (poly(3,4-ethylenedioxythiophene):poly(styrenesulfonate)). PEDOT:PSS may be produced by oxidative polymerization of EDOT using polystyrene sulfonate (PSS) as a template to balance charge.

Meanwhile, the carbon layer 130 may be laminated on the conductive polymer layer 120 and may be laminated by dissolving carbon powder in an organic solvent including an epoxy resin, dipping the tantalum element 110 into the solution in which the carbon powder is dissolved, and then, perform drying at a predetermined temperature to volatilize the organic solvent.

In addition, the carbon layer 130 may serve to prevent silver (Ag) ions from passing therethrough.

Next, the silver (Ag) layer 140 formed of silver (Ag) paste may be included on the upper surface of the carbon layer 130.

The silver (Ag) layer 140 may be laminated on the outside of the carbon layer 130 to improve conductivity.

In addition, the silver (Ag) layer 140 may facilitate electrical connection for polarity transfer by improving conductivity for the polarity of the negative electrode layer.

FIGS. 4 to 13 are cross-sectional views taken along line I-I' of FIG. 1, illustrating an arrangement of a coating layer of the present disclosure.

The tantalum capacitor according to the present disclosure includes the coating layer 500.

The related art tantalum capacitors without a coating layer have a problem in that sufficient adhesion between the lead frame and the molded unit is not secured, resulting in interfacial defects. Vapor pressure may penetrate into the capacitor through the interface opened in a high-temperature and 1 high-humidity environment, thereby degrading the reliability of the component (hereinafter referred to as moisture absorption defect).

The tantalum capacitor according to the present disclosure may strengthen the interface between the lead frame and the molded unit to lower the moisture absorption rate, thereby ensuring reliability. In addition, by using a material having excellent elasticity, the tantalum capacitor may have enhanced characteristics against internal stress when the internal element expands due to moisture penetration.

The first coating layer 510 is disposed in at least a portion of the interface between the molded unit 200 and the anode lead frame 300 and the interface between the molded unit 200 and the cathode lead frame 400.

The first coating layer 510 may extend to the second surface 2 of the molded unit 200. As the lead frames 300 and 400 extend to the second surface 2 of the molded unit 200, the interface between the molded unit of the second surface and the lead frame may have a structure vulnerable to penetration of external vapor pressure. As in the present disclosure, as the first coating layer 510 extends to the second surface 2 of the molded unit 200, penetration of external vapor pressure may be fundamentally blocked.

The first coating layer 510 may include an organosilicon compound. The organosilicon compound may be formed to include a material having a hydrophobic functional group, and may form crosslinks with the surfaces of the molded unit 200 and the lead frames 300 and 400. In this specification, "bonding" may refer to a state in which surfaces of an adhesive and an adherend are bonded by bonding force of the interfaces. The bonding force of the interfaces may be due to chemical interaction between the surface molecules of the adhesive and the adherend or may be due to mechanical bonding. In this specification, "crosslinking" may refer to forming a network structure through chemical/physical bonds, such as covalent bonds, ionic bonds, Van der Waals bonds, or hydrogen bonds between molecules.

It may be difficult for a resin, such as EMC, of the molded unit 200 that forms the exterior of the tantalum capacitor to secure sufficient adhesion with the lead frames 300 and 400, and thus, interfacial defects may occur. In addition, there is a problem in that it is difficult to effectively suppress the penetration of moisture due to a low water repellent effect.

In contrast, the first coating layer 510 according to the present disclosure may be connected to the molded unit 200 and the lead frames 300 and 400 through the cross-linking described above, thereby providing better bonding strength.

The first coating layer 510 may include multifunctional alkoxy silane. The alkoxy silane has hydrophobicity, so it may prevent moisture infiltration and contamination and may improve mechanical strength against bending stress through a curing reaction.

In an example, the first coating layer 510 may include a silane coupling agent. In this case, one end of the silicon (Si) atom of the first coating layer 510 may be covalently or hydrogen bonded to the molded unit 200 and the lead frames 300 and 400, and the other end of the silicon (Si) atom may be bonded with is hydrophobic functional groups.

Specifically, the silane coupling agent has two functional groups with different reactivity in one molecule, that is, a hydrophilic group and a hydrophobic group and may be represented by [Chemical Formula 1] below.

$$X\text{—}Si\text{–}R_3 \quad \text{[Chemical Formula 1]}$$

(Here, $R_3$ refers to a hydrolysis hydrophilic functional group, and X refers to a nonhydrolyzable hydrophobic functional group.)

The $R_3$ is a substance that chemically bonds with an inorganic material, and may be, for example, an alkoxy group (R—O) having an alkyl group of 1 to 16 carbon atoms, such as methoxy ($CH_3O$—) or ethoxy ($C_2H_5O$—).

The X may include an epoxy group, vinyl group ($CH_2CH$—), amino group (—$NH_2$), acrylic group, methacryl group, mercapto group (SH—) or the like, but is not limited thereto.

Specific examples of the silane coupling agent may include 3-glycidoxypropyltrimethoxysilnae (GPTMS), 3-glycidoxypropyltriethoxysilnae (GPTES), vinyltriethoxsilane, aminopropyltrimethoxysilane (APTMS), or the like, but are not limited thereto. These silane coupling agents may be used alone or two or more types thereof may be combined to be used.

The first coating layer 510 may be formed on the lead frames 300 and 400 of the semi-finished tantalum capacitor by dipping, spraying, or deposition, but is not limited thereto. Here, the semi-finished product state may collectively refer to a state before the molded unit 200, which forms the exterior of the tantalum capacitor, is formed.

The first coating layer 510 may have a thickness of more than 0 μm and less than or equal to 30 μm.

If the first coating layer 510 is not disposed between the molded unit 200 and the lead frames 300 and 400, sufficient adhesion between the molded unit 200 and the lead frames 300 and 400 may not be secured, resulting in interfacial defects. In addition, reliability may be deteriorated due to moisture absorption between the open interfaces.

If the thickness of the first coating layer 510 is more than 30 μm, a separation phenomenon may occur at the EMC interface of the molded unit 200, which may reduce reliability due to moisture absorption through the interface.

Table 1 below illustrates moisture absorption defects and interfacial defects according to the thickness of the first coating layer 510. The comparative example may be considered a conventional tantalum capacitor without a coating layer as illustrated in FIG. 3.

TABLE 1

| No | Thickness [μm] | Moisture absorption defect | Interfacial defect |
|---|---|---|---|
| 1(Comparative Example) | 0 | defective | defective |
| 2 | 0.5 | OK | OK |
| 3 | 1 | OK | OK |
| 4 | 10 | OK | OK |
| 5 | 20 | OK | OK |
| 6 | 30 | OK | OK |
| 7 | 30~100 (not including 30) | defective | defective |

Figure 4:
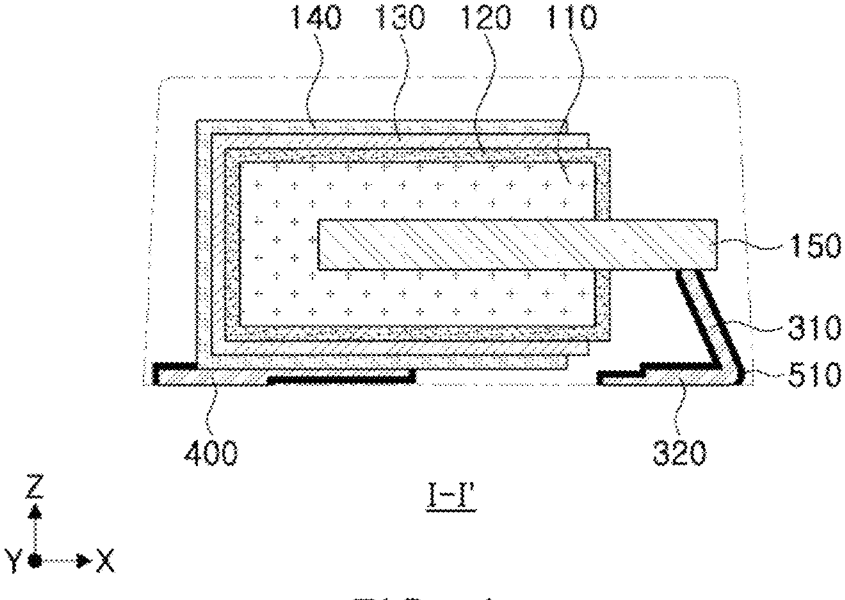
FIGS. 4 to 13 are cross-sectional views taken along line I-I' of FIG. 1, schematically illustrating an arrangement of a coating layer of the present disclosure.
Figure 5:
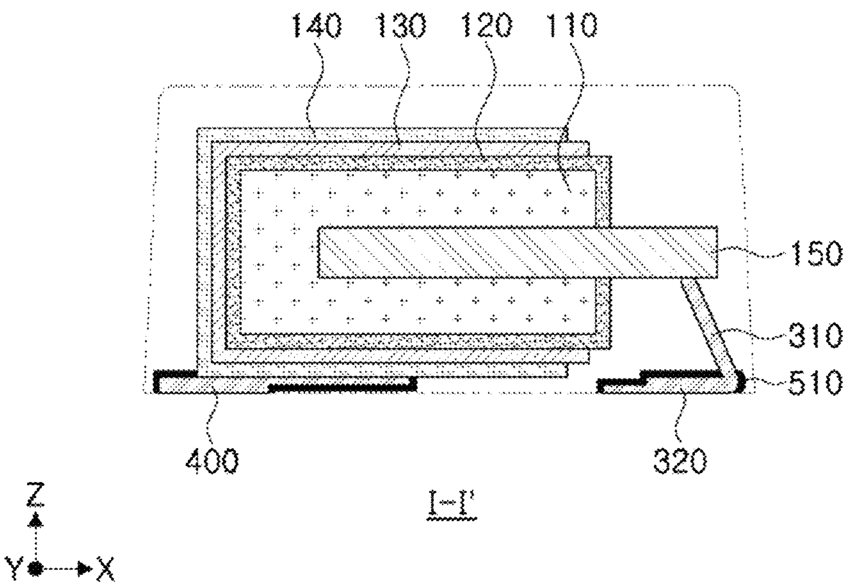

FIGS. 4 and 5 illustrate a case in which the first coating layer 510 is disposed on the lead frames 300 and 400.

Referring to FIG. 4, the first coating layer 510 is disposed on both the interface between the molded unit 200 and the anode lead frame 300 and the interface between the molded unit 200 and the cathode lead frame 400. In this manner, the first coating layer 510 may be preferentially formed on the lead frames 300 and 400 and then combined with the tantalum body 100 to be formed.

Alternatively, as illustrated in FIG. 5, after the lead frames 300 and 400 are combined with the tantalum body 100, the first coating layer 510 may be formed only at a lower portion of the lead frame, that is, in a region located below the tantalum body. Specifically, the first coating layer 510 may be formed only on the first connection portion 320 of the cathode lead frame 400 and the anode lead frame 300 and may not be formed on the first bent portion 310.

Referring to FIGS. 6 to 10, the first coating layer 510 may also be disposed on the tantalum body 100.

That is, the first coating layer 510 may be disposed not only in the interface between the molded unit 200 and the lead frames 300 and 400, but also in the interface between the molded unit 200 and the tantalum body 100. Specifically, the first coating layer 510 may be in direct contact with the conductive polymer layer 120 and the silver (Ag) layer 140.

As described above, the first coating layer 510 secures sufficient interfacial bonding strength between the molded unit 200 and the lead frames 300 and 400 to prevent moisture absorption defects, but in addition, the first coating layer 510 may be dually disposed, directly on the tantalum body 100, thereby further improving moisture resistance reliability. In addition, when the tantalum body 100 expands due to moisture penetration, internal stress is likely to occur. Here, the first coating layer 510 having elastic force may be disposed between the molded unit 200 and the tantalum body 100 to have enhanced characteristics against internal stress.

Figure 6:
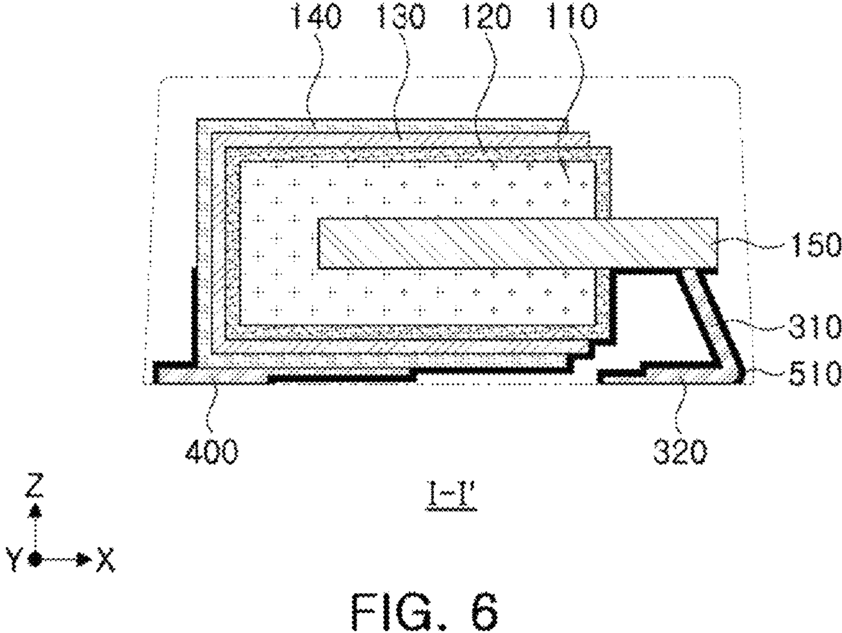

Referring to FIG. 6, after the lead frames 300 and 400 are combined with the tantalum body 100, the first coating layer 510 may be formed horizontally only on a half thereof. Specifically, the first coating layer may be disposed in a region of the tantalum body 100 closer to the second surface 2, among the first surface 1 and the second surface 2 of the molded unit 200.

Figure 7:
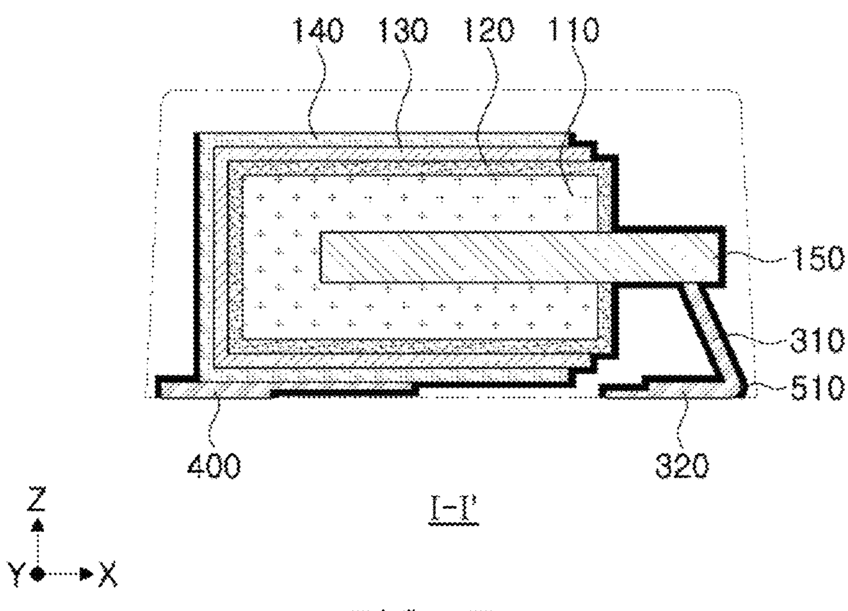

Referring to FIG. 7, the first coating layer 510 may not be disposed on an upper surface of the tantalum body 100. Here, the upper surface of the tantalum body 100 refers to a surface of the tantalum body 100 facing the first surface 1 of the molded unit 200. That is, the first coating layer 510 may be disposed on the entire interface with the molded unit 200 excluding the upper surface of the tantalum body.

Figure 8:
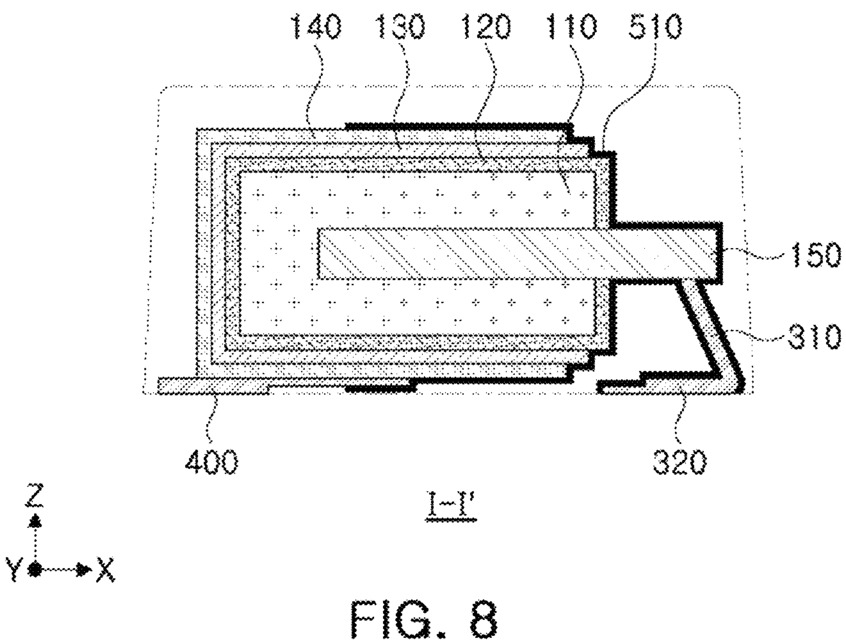
Figure 9:
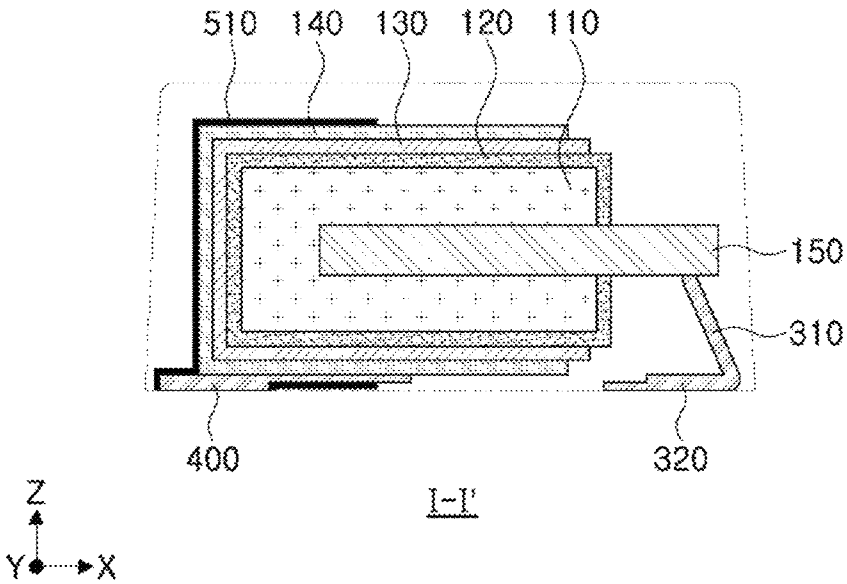

Referring to FIGS. 8 and 9, after the lead frames 300 and 400 are combined with the tantalum body 100, the first coating layer 510 may be formed on only a half thereof vertically. Specifically, as illustrated in FIG. 8, the first coating layer 510 may be disposed in a region of the tantalum body 100 close to the fifth surface 5, among the fifth surface 5 and the sixth surface 6 of the molded unit 200. Alternatively, as illustrated in FIG. 9, the first coating layer 510 may be disposed in a region of the tantalum body 100 close to the sixth surface 6, among the fifth surface 5 and the sixth surface 6 of the molded unit 200.

That is, as illustrated in FIGS. 6 to 9, in a semi-finished tantalum capacitor, a coating layer may be selectively formed only on portions vulnerable to moisture penetration.

Figure 10:
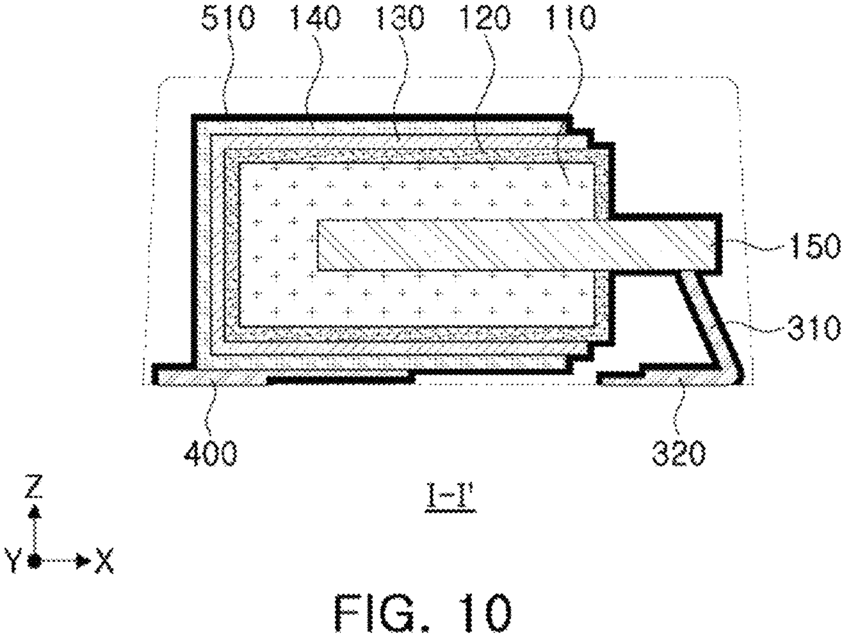

Alternatively, as illustrated in FIG. 10, the first coating layer 510 may be formed on the entire interface between the molded unit 200 and the lead frames 300 and 400 and the interface between the molded unit 200 and the tantalum body 100.

However, without being limited thereto, and as described above, the first coating layer 510 may be disposed only in the interface between the molded unit 200 and the lead frames 300 and 400, and the first coating layer 510 may not be disposed in the interface between the molded unit 200 and the tantalum body 100.

Figure 11:
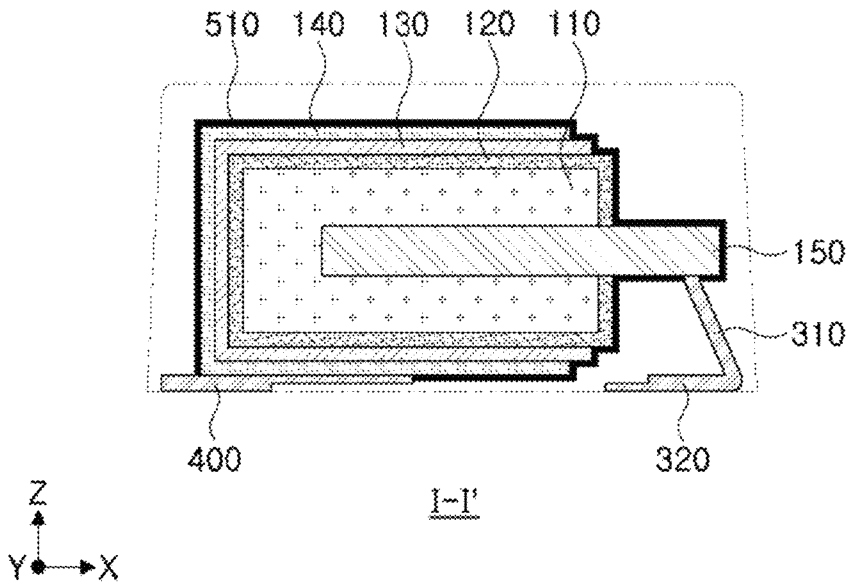

Referring to FIG. 11, in another exemplary embodiment in the present disclosure, after the tantalum body 100 is coated, the tantalum body 100 and the lead frames 300 and 400 are combined. Here, the first coating layer 510 may be disposed only in the interface between the molded unit 200 and the tantalum body 100.

A thickness and arrangement of the first coating layer 510 may be checked in the following manner. A cross-sectional sample of the tantalum capacitor is collected by polishing a first direction (the X-direction)-third direction (the Z-direction) of the tantalum capacitor to a depth of about ½ in the second direction (the W-direction). The thickness and arrangement of the coating layer in the interfacial region with the molded unit may be checked by observing the collected cross-sectional sample by a scanning electron microscope (SEM) at a magnification of 500 to 20,000.

Figure 12:
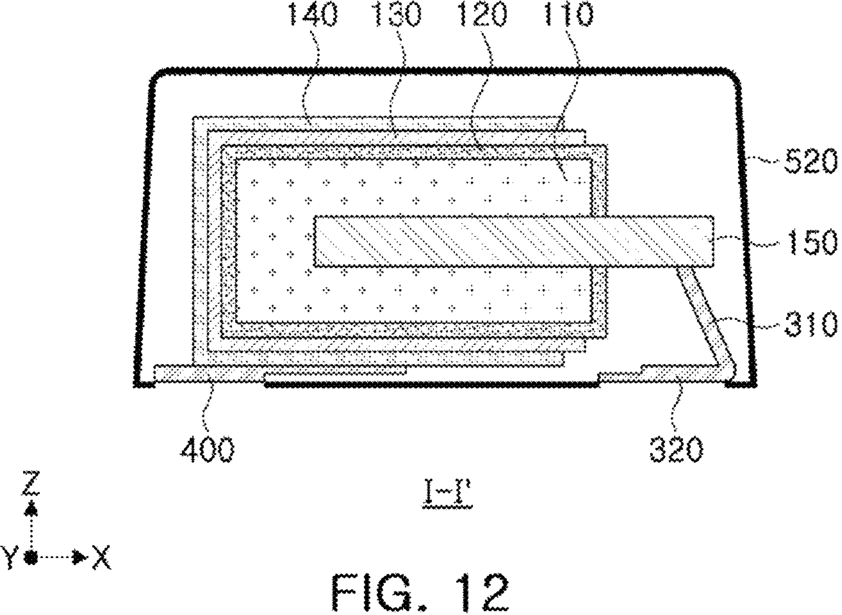
Figure 13:
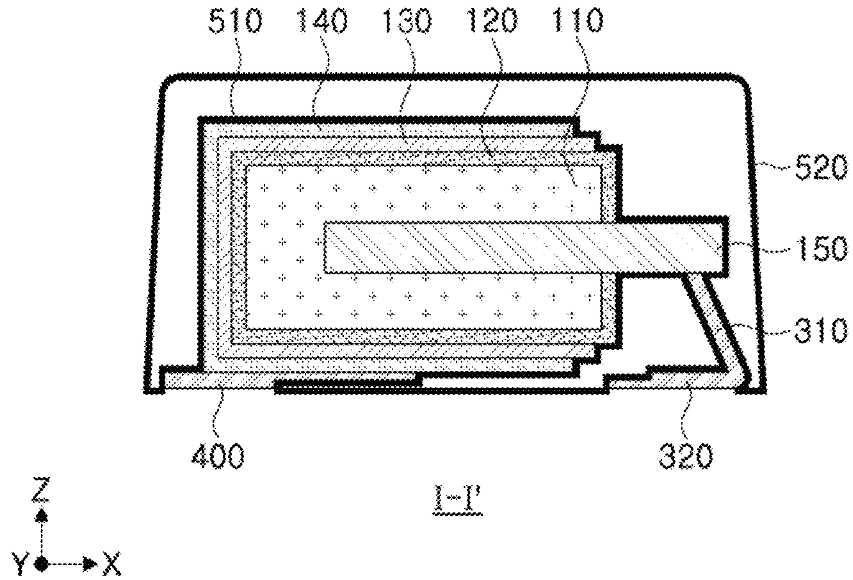

Referring to FIGS. 12 and 13, the tantalum capacitor according to the present disclosure may further include a second coating layer 520. The second coating layer 520 may be disposed on the surface of the molded unit 200 of the tantalum capacitor to prevent moisture penetration due to external liquid substances, etc.

The second coating layer 520 may be disposed on the first to sixth surfaces of the molded unit 200 and may include a compound including fluorine (F).

Specific examples of compounds including fluorine (F) may include 1H, 1H, 2H, 2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptyl acrylate, 2-methyl-3,3,4,4,5,5,6,6,7,7,7-undecafluoroheptyl acrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroundecyl acrylate, 3,3,4,4,5,5,6,6,7,7,8,8,9,9,10,10,11,11,11-2-methyl-nonadecafluoroundecyl acrylate, 3,3,4,4,5,5,6,6,7,7,8,8,9,9,10,10,11,11,12,12,12-heneicosafluorododecyl acrylate, 2-methyl-3,3,4,4,5,5,6,6,7,7,8,8,9,9,10,10,11,11,12,12,12-heneicosafluorododecyl 3,3,4,4,5,5,6,6,7,7,8,8,9,9,10,10,11,11,12,12,13,13,13-acrylate, tricosafluorotridecyl acrylate, 2-methyl-3,3,4,4,5,5,6,6,7,7,8,8,9,9,10,10,11,11,12,12,13, 13,13-tricosafluorotridecyl acrylate, 3,3,4,4,5,5,6,6,7,7,8,8,9,9,10,10,11,11,12,12,13,13,14,14,14-pentacosafluorotetradecyl acrylate, 2-methyl-3,3,4,4,5,5,6,6,7,7,8,8,9,9,10,10,11,11,12,12,13,13,14,14,14-pentacosafluorotetradecyl acrylate or the like, but are not limited thereto.

The compound including fluorine (F) may provide excellent water repellency and physical/chemical resistance to external substances.

The second coating layer 520 may be disposed on the second surface of the molded unit 200 and expose the anode and cathode lead frames 300 and 400.

One effect of the present disclosure provides the tantalum capacitor having excellent reliability by strengthening the interface and lowering the moisture absorption rate.

Another effect of the present disclosure provides the tantalum capacitor having enhanced characteristics against stress.

While example exemplary embodiments have been illustrated and described above, it will be apparent to those skilled in the art that modifications and variations could be made without departing from the scope of the present disclosure as defined by the appended claims.

What is claimed is:

1. A tantalum capacitor comprising:
- a tantalum body including a tantalum element, a conductive polymer layer disposed on the tantalum element, and a tantalum wire penetrating through at least a portion of each of the tantalum element and the conductive polymer layer in a first direction;
- a molded unit surrounding the tantalum body and including fifth and sixth surfaces opposing each other in the first direction, third and fourth surfaces opposing each other in a second direction, and first and second surfaces opposing each other in a third direction;
- an anode lead frame exposed to the second surface of the molded unit and connected to the tantalum wire;
- a cathode lead frame spaced apart from the anode lead frame and exposed to the second surface of the molded unit; and
- a first coating layer including one portion disposed in a region between the molded unit and the anode lead frame and another portion disposed in a region between the molded unit and the cathode lead frame, the one portion and the another portion of the first coating layer spaced apart from each other.

2. The tantalum capacitor of claim 1, wherein the first coating layer includes an organosilicon compound.

3. The tantalum capacitor of claim 2, wherein the first coating layer includes a multifunctional alkoxy silane.

4. The tantalum capacitor of claim 1, wherein the first coating layer has a thickness of more than 0 μm and less than or equal to 30 μm.

5. The tantalum capacitor of claim 1, wherein the first coating layer extends to the second surface of the molded unit.

6. The tantalum capacitor of claim 1, wherein
- the anode lead frame includes a first connection portion and a first bent portion, and
- the first coating layer is not disposed on the first bent portion.

7. The tantalum capacitor of claim 1, wherein
the tantalum body further includes:
- a carbon layer disposed on the conductive polymer layer; and
- a silver (Ag) layer disposed on the carbon layer.

8. The tantalum capacitor of claim 1, wherein the first coating layer is also disposed at a region between the molded unit and the tantalum body.

9. The tantalum capacitor of claim 8, wherein the first coating layer is disposed in a region of the tantalum body closer to the fifth surface, among the fifth surface and the sixth surface of the molded unit, than the sixth surface.

10. The tantalum capacitor of claim 8, wherein the first coating layer is disposed in a region of the tantalum body closer to the sixth surface, among the fifth surface and the sixth surface of the molded unit, than the fifth surface.

11. The tantalum capacitor of claim 8, wherein the first coating layer is disposed in a region of the tantalum body closer to the second surface, among the first surface and the second surface of the molded unit, than the first surface.

12. The tantalum capacitor of claim 8, wherein the first coating layer is not disposed on an upper surface of the tantalum body which faces the first surface of the molded unit.

13. The tantalum capacitor of claim 1, wherein
- the anode lead frame includes a first connection portion and a first bent portion, and
- the first coating layer is disposed on the first connection portion and the first bent portion.

14. The tantalum capacitor of claim 1, wherein
the first coating layer is disposed on the tantalum wire.

15. The tantalum capacitor of claim 1, wherein
the first coating layer is spaced apart from the tantalum wire.

16. A tantalum capacitor comprising:
- a tantalum body including a tantalum element, a conductive polymer layer disposed on the tantalum element, and a tantalum wire penetrating through at least a portion of each of the tantalum element and the conductive polymer layer in a first direction;
- a molded unit surrounding the tantalum body and including fifth and sixth surfaces opposing each other in the first direction, third and fourth surfaces opposing each other in a second direction, and first and second surfaces opposing each other in a third direction;
- an anode lead frame exposed to the second surface of the molded unit and connected to the tantalum wire;
- a cathode lead frame spaced apart from the anode lead frame and exposed to the second surface of the molded unit; and
- a first coating layer disposed in at least a portion of a region between the molded unit and the tantalum body and having a thickness of more than 0 μm and less than or equal to 30 μm; and
- a second coating layer disposed on the first to sixth surfaces of the molded unit, wherein the first coating layer and the second coating layer comprise different materials.

17. The tantalum capacitor of claim 16, wherein the first coating layer includes an organosilicon compound, and the second coating layer includes a compound including fluorine (F).

* * * * *